(12) United States Patent
Bouchard

(10) Patent No.: US 9,189,455 B2
(45) Date of Patent: Nov. 17, 2015

(54) ADAPTIVE WEIGHTED STOCHASTIC GRADIENT DESCENT

(75) Inventor: Guillaume Bouchard, Saint-Martin-le-Vinoux (FR)

(73) Assignee: XEROX Corporation, Norwalk, CT (US)

(*) Notice: Subject to any disclaimer, the term of this patent is extended or adjusted under 35 U.S.C. 154(b) by 842 days.

(21) Appl. No.: 13/482,344

(22) Filed: May 29, 2012

(65) Prior Publication Data

US 2013/0325401 A1 Dec. 5, 2013

(51) Int. Cl.
*G06F 15/18* (2006.01)
*G06F 17/11* (2006.01)
*G06Q 40/04* (2012.01)

(52) U.S. Cl.
CPC ............... *G06F 17/11* (2013.01); *G06Q 40/04* (2013.01)

(58) Field of Classification Search
None
See application file for complete search history.

(56) References Cited

U.S. PATENT DOCUMENTS 6,381,586 B1 * 4/2002 Glasserman et al. ........ 705/36 R

OTHER PUBLICATIONS

Zinkevich ("Online Convex Programming and Generalized Infinitesimal Gradient Ascent", CMU-CS-03-110, 2003, 28 pages.*

Al-Qaq, et al. "Stochastic gradient optimization of importance sampling for the efficient simulation of digital communication systems", Dec. 1995, IEEE Transaction on Communications, 43(12):2975-2985.
Al-Qaq, et al. "A stochastic importance sampling methodology for the efficient simulation of adapative systems in frequency nonselective rayleigh fading channels", IEEE Journal on Selected Areas in Communications, May 1997, 15(4):614-625.
Bottou, et al. "The tradeoffs of large scale learning", Optimization for Machine Learning, 2011, MIT Press, p. 351-368.
Bottou. "Online algorithms and stochastic approximations", Online Learning and Neural Networks, 1998, p. 1-34.
Friedlander, et al. "Hybrid deterministic-stochastic methods for data fitting", UBC-CS technical report, TR-2011-01, Jan. 5, 2012, http://www.arxiv.org/abs/1104.2373v3.
Robbins, et al. "A stochastic approximation method", Annals of Mathematical Statistics, 1951, 22(3):400-407.

* cited by examiner

*Primary Examiner* — Li-Wu Chang
(74) *Attorney, Agent, or Firm* — Fay Sharpe LLP

(57) ABSTRACT

A system and method for solving an optimization problem are disclosed which are based on adaptive weighted stochastic gradient descent. The method includes receiving data to be sampled in optimizing an integral of a second function and, for a number of iterations, sampling the data according to a modified distribution function which depends on at least one parameter, updating at least one parameter of the second function, and updating at least one parameter of the modified distribution function. In a subsequent one of the iterations, the modified distribution function used in sampling the data is based on the updated at least one parameter of the distribution function. Information is output, which can be based on the integral function with the at least one updated parameter.

20 Claims, 6 Drawing Sheets

ADAPTIVE WEIGHTED STOCHASTIC GRADIENT DESCENT

BACKGROUND

The exemplary embodiment relates to optimization of integral functions and finds particular application in connection with a system and method which used an adapted weighted stochastic gradient descent approach to update a probability distribution function used for sampling data during the optimization.

Many problems involve optimizing a function (e.g., minimizing a cost function or maximizing a future reward) with respect to some parameters (such as the investment level on each different asset). The function to optimize is often an integral (for example, an expectation, i.e., the average over multiple possible outcomes). When this integral is not tractable, i.e., when it is hard to compute, the optimization problem is itself difficult. In many real-world problems, such as those involving intractable integrals, such as the averaging on combinatorial spaces, non-Gaussian integrals, etc., the solution can be expressed as an integral of a function of a sampled value and a gradient of the function. Stochastic Gradient Descent (SGD) is an optimization technique that can optimize an integral without having to compute it. However, SGD is known to be slow to converge.

Stochastic approximation is a class of methods to solve intractable equations by using a sequence of approximate (and random) evaluations. See, H. Robbins and S. Monro, "A stochastic approximation method," Annals of Mathematical Statistics, 22(3):400 407, 1951. Stochastic Gradient Descent (SGD) is a special type of stochastic approximation method that optimizes an integral using approximate gradient steps (See, Léon Bottou, "Online algorithms and stochastic approximations," in Online Learning and Neural Networks (David Saad, Ed., CUP 1998). It has been shown that this technique is very useful in large scale learning tasks because it can provide good generalization properties with a small number of passes through the data (See, Léon Bottou and Olivier Bousquet, "The tradeoffs of large scale learning," in Optimization for Machine Learning, pp. 351-368 (Suvrit Sra, Sebastian Nowozin, and Stephen J. Wright, Eds, MIT Press, 2011).

The convergence properties of the SGD algorithms are directly linked to the variance of the gradient estimate. A tradeoff between the variance of the gradient and the convergence speed can be obtained using batching (see, for example, M. Friedlander and M. Schmidt, "Hybrid deterministic-stochastic methods for data fitting," UBC-CS technical report, TR-2011-01. However, with batching, the time required for every step increases with the size of the batch.

There remains a need for an improvement to the standard SGD algorithms for solving optimization problems efficiently, without introducing errors.

BRIEF DESCRIPTION

In accordance with one aspect of the exemplary embodiment, an optimization method includes receiving data to be sampled in optimizing a first function, which is an integral of a second function weighted according to a base probability distribution, the second function having at least one first parameter to be determined in the optimizing of the integral first function. For a number of iterations, the method includes sampling the data according to a modified probability distribution function which depends on at least one second parameter, updating at least one of the at least one first parameter of the second function, and updating at least one of the at least one second parameter of the modified probability distribution function. In a subsequent one of the iterations, the modified probability distribution function used in sampling the data is based on the updated at least one second parameter of the distribution function. Information is output, based on the at least one first parameter of the second function as updated in a later one of the iterations.

In accordance with another aspect of the exemplary embodiment, a system includes memory which receives data to be sampled in optimizing an integral function, which is an integral of a second function weighted according to a base probability distribution, the second function having at least one first parameter to be determined in the optimizing of the integral function. A sampling component samples the data according to a modified probability distribution function which depends on at least one second parameter. A first update component updates the at least one first parameter of the second function. A second update component updates the at least one second parameter of the modified probability distribution function. In a subsequent one of a number of iterations, the modified probability distribution function used by the sampling component for sampling the data is based on the updated second parameter of the modified probability distribution function. An information output component outputs information based on the at least one updated first parameter of the integral function of a later one of the iterations. A processor implements the first and second update components.

In accordance with another aspect of the exemplary embodiment, a method for optimizing a first function using adaptive weighted stochastic gradient descent is provided. The method includes receiving data to be sampled in optimizing a first function which is an integral of a second function depending on at least one first parameter in which elements are weighted by a probability distribution function. For a number of iterations, the method includes sampling the data according to a modified distribution function which depends on at least one second parameter, updating the at least one first parameter of the second function based on a first step size and an estimation of the gradient of the second function, and updating at least one of the at least one second parameter of the distribution function based on a second step size an estimation of the variance of the gradient of the second function. In a subsequent one of the iterations, the distribution function used in sampling the data is based on the updated at least one second parameter of the distribution function. Information is output, based on the at least one first parameter of the second function, as updated in a later one of the iterations.

DETAILED DESCRIPTION

The exemplary system and method provide an improvement over a standard Stochastic Gradient Descent (SGD) algorithm for optimizing an integral (first) function, which is an integral of a second function of a sampled value and a gradient of the second function, over a space of values. To reduce the variance of the gradient, an optimal sampling distribution is learned using a parallel SGD algorithm that learns how to minimize the variance of the gradient of the second function.

In particular, the method accelerates an SGD algorithm for learning the parameters of the second function by learning a weight function that minimizes the variance of the approximate gradient involved in each step of the algorithm, while optimizing the function. While there is a constant extra computational cost to pay at each iteration to learn the weight function, this cost is the same for each iteration, which may be compensated for by the increase of convergence speed.

Figure 1:
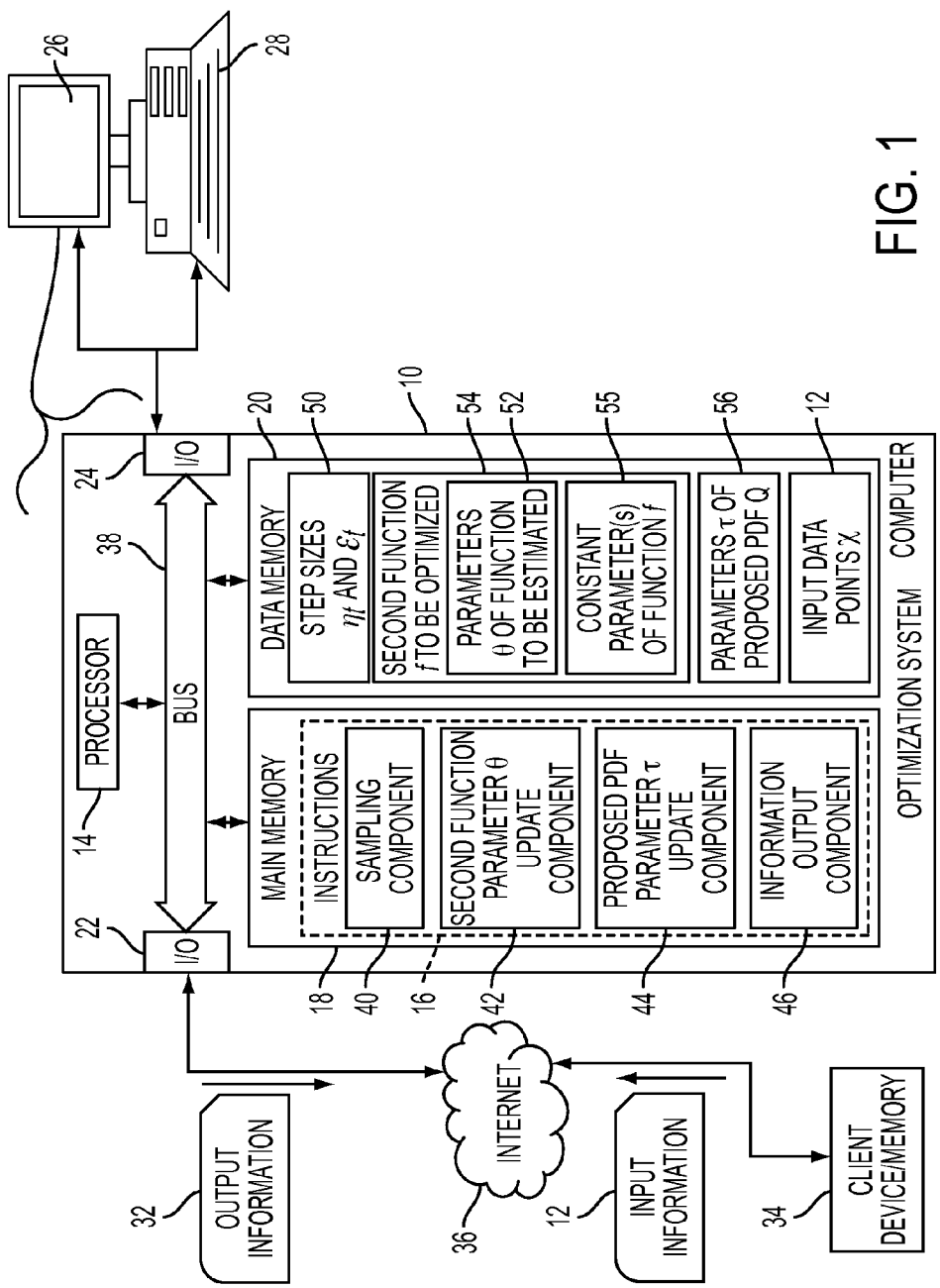
FIG. 1 is a functional block diagram of an exemplary computer system for optimizing a function in accordance with one aspect of the exemplary embodiment.

With reference to FIG. 1, a functional block diagram of a computer-implemented optimization system 10 is shown. The computer system is configured for optimizing an integral function, given a set of input data 12 to be sampled, enabling parameters of the second function, and/or information based on the integral function, to be estimated. The illustrated computer system 10 includes a processor 14, which controls the overall operation of the computer system 10 by execution of processing instructions 16 which are stored in non-transitory memory 18, communicatively connected to the processor 14. Data memory 20 stores data 12 being processed. Computer system 10 also includes one or more input/output interfaces, such as a network interface 22 and a local interface 24. The I/O interface 24 may communicate with one or more of a display 26, for displaying information to users, and a user input device, such as a keyboard 28 or touch or writable screen, and/or a cursor control device, such as mouse, trackball, or the like, for inputting text and for communicating user input information and command selections to the processor 12. The network interface 22 allows the computer to communicate input information 12 and output information 32 (such as parameters of the optimized function or a solution thereof) with other devices, such as the illustrated client device 34, via a computer network 36, such as a local area network (LAN) or wide area network (WAN), or the Internet, and may comprise a modulator/demodulator (MODEM).

The various hardware components 14, 18, 20, 22, 24 of the computer 10 may be all connected by a bus 38. The processor 14 executes the instructions 16 for performing the exemplary method outlined in FIG. 2.

The computer system 10 may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 18, 20 may represent any type of non-transitory computer readable medium such as random access memory (RAM), read only memory (ROM), magnetic disk or tape, optical disk, flash memory, or holographic memory. In one embodiment, the memory 18, 20 comprises a combination of random access memory and read only memory. In some embodiments, the processor 14 and memory 18 and/or 20 may be combined in a single chip.

The digital computer processor 14 can be variously embodied, such as by a single-core processor, a dual-core processor (or more generally by a multiple-core processor), a digital processor and cooperating math coprocessor, a digital controller, or the like.

The exemplary system includes one or more software components 40, 42, 44, 46 for implementing an algorithm for optimizing the integral function as described below. These components may include a sampling component 40, a function parameter update component (or first update component) 42, a probability distribution function update component (or second update component) 44, and an information output component 46, which are best understood with reference to the method, described below. These components use the input data 12 as well as input or computed step sizes 50 to optimize parameters 52 of the integral function 54 stored in memory that has a set of predefined fixed parameters 55 and, in the process, to optimize parameters of a weighted distribution function 56 used by the sampling component 40 for selecting samples of the data 12 to be used in a next iteration by the function parameter update component 42.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
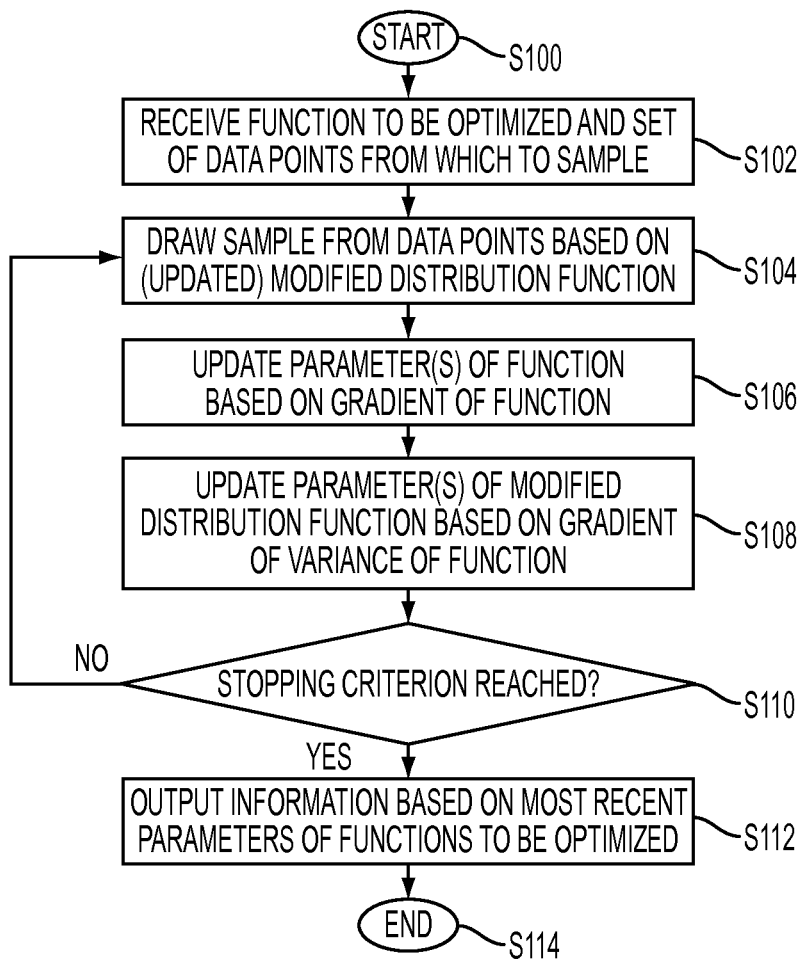
FIG. 2 is a flow chart illustrating a method for optimizing a function in accordance with another aspect of the exemplary embodiment.
Figure 3A:
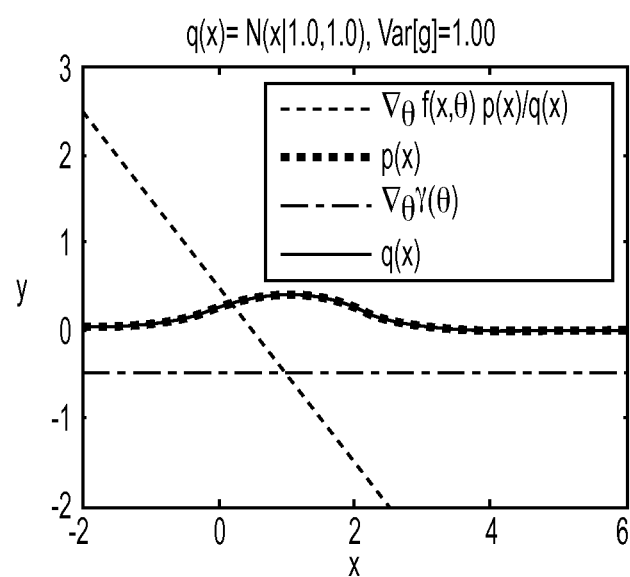
FIG. 3 illustrates exemplary probability distribution functions.
Figure 3B:
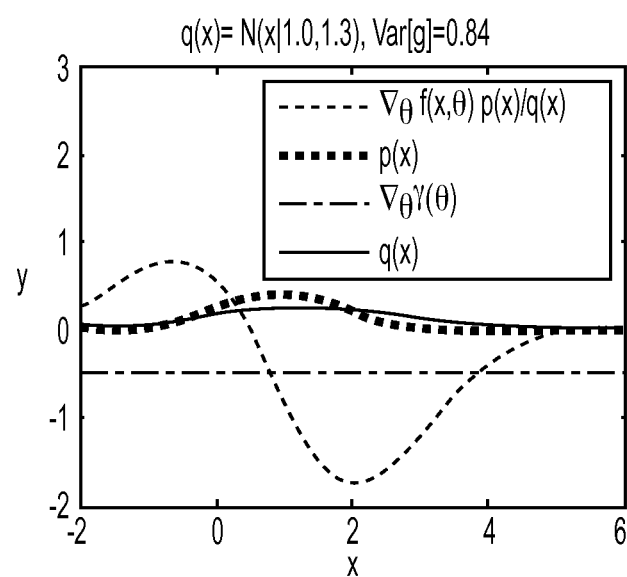
Figure 3C:
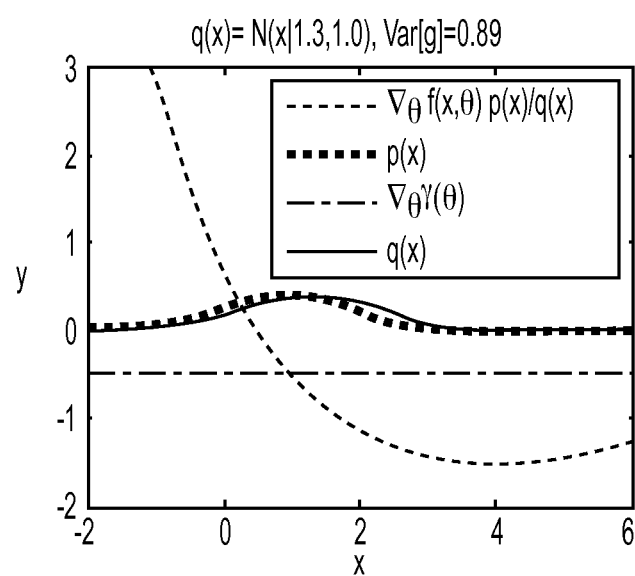
Figure 3D:
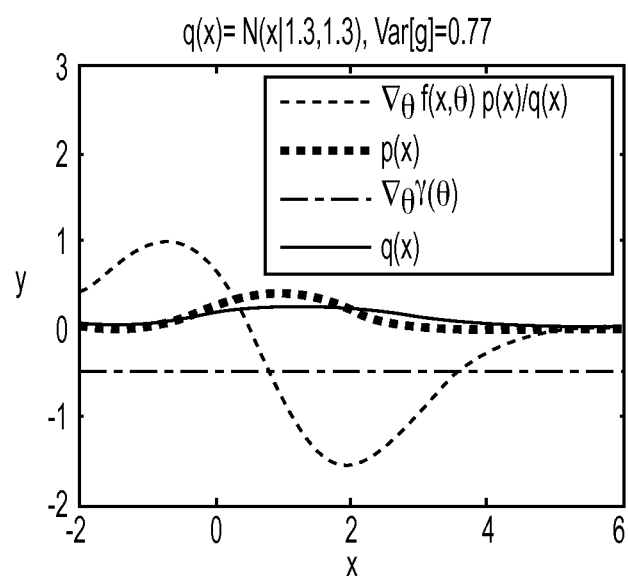

FIG. 2 illustrates an exemplary method for optimizing an integral function 54, by optimizing parameters 52 for the pre-defined set of fixed parameters 55, which can be performed with the system of FIG. 1. The method is best understood with reference to Algorithm 1 below. The method begins at S100.

At S102, a set of data points 12 to be sampled is received into memory (or simply a sample space from which the data points are to be sampled). The data points x can each be a scalar value or a vector comprising two or more values. If not already stored, a function $\gamma(\theta)$ (54) to be optimized on the data points x (12) is also received into memory. The integral function is defined in terms of a second function $f$, which is a function of x, one or more variable parameters $\theta$ (52), and a set of constant parameters (55), where the weight of each value x in the function is determined according to a base probability distribution P.

For each of a number of iterations, steps S104, S106, and S108 are performed, e.g., in sequence. The number of iterations may be at least 2, or at least 10, or at least 100, such as at least 1000.

At S104, a sampling step is performed (by the sampling component 40), by drawing a data point x from the set X (12) of data points, where the sampling is based on a modified probability distribution (function) $Q$ which is continuous with the base probability distribution P but which differs in its parameters $\tau$ (56).

At S106, parameters $\theta$ (52) of the function $f$ (54) to be optimized are updated (by the function parameter update component 42), through a stochastic gradient descent step with a magnitude specified by a step size parameter $\eta_t$ (50).

At S108, parameters $\tau$ (56) of the probability distribution function $Q$ are updated (by the probability distribution function update component 44), also through a stochastic gradient descent step of magnitude $\epsilon_t$, in the direction of a smaller variance for the approximate gradient. In the next iteration, the data point sampled in S104 is drawn based on the updated probability distribution function $Q$, defined by parameters $\tau$ Depending on the modification to $Q$, this can make drawing certain samples more likely to be in the direction of the exact gradient than in the prior iteration, which expedites the convergence in a manner which generally outweighs the cost of the additional computation time which S108 entails.

At S110, if convergence or other stopping criterion has not been reached, the method returns to S104 for the next iteration, otherwise to S112, where information is output (by the information output component 46). The information may include one or more of the value of the optimized function, its parameters, and information based thereon, derived from the most recent (or one of the most recent) iterations. The method ends at S114.

The method illustrated in FIG. 2 may be implemented in a computer program product that may be executed on a computer. The computer program product may comprise a non-transitory computer-readable recording medium on which a control program is recorded (stored) for implementing at least a part of the exemplary method, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

As will be appreciated, the steps of the method need not all proceed in the order illustrated and fewer, more, or different steps may be performed.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Stochastic Gradient Descent

First, a summary of the stochastic gradient descent method is provided by way of background.

In general, as in existing stochastic gradient methods, the exemplary method allows optimization, e.g., minimization, of integral functions of the general form:

$$\gamma(\theta) = \int_X f(x; \theta) dP(x) \quad (1)$$

where $\gamma(\theta)$ represents a possible solution, $dP(x)$ represents the weight applied to a sample x, where P is a probability distribution on a measurable space $\Xi$ from which all data samples x are drawn, and $f$ is a function from $X \times \theta$ into $\Re$, where $\Re$ is the set of real numbers and $\theta$ is a parameter from a set $\Theta$ of one or more variable parameters (52) to be learned. The object is to identify the values of parameters $\theta$ which provide an optimal value of $\gamma$. A variety of different functions can be used as function $f$, examples of which are given below.

Stochastic Gradient Descent (SGD) is a stochastic approximation method which involves performing approximate gradient steps equal, on average to the true gradient $\nabla_\theta \gamma(\theta)$ of the function $\gamma(\theta)$ given distribution P, i.e., its derivative.

In some applications disclosed herein, such as logistic regression learning, the function $f$ is the log-likelihood and P is an empirical distribution $$\frac{1}{n} \sum_{i=1}^{n} \delta(x, x_i)$$

where $\{x_1, \ldots, x_n\}$ is a set of i.i.d. (independently identically distributed) data points sampled from an unknown distribution and $\delta(x, x_i)$ represents the Dirac distribution at position $x_i$ (see, Léon Bottou, "Online algorithms and stochastic approximations," in Online Learning and Neural Networks (David Saad, Ed., CUP, 1998).

The conventional SGD method involves a sequence of iterations (steps). At a given step t, the conventional SGD method can be viewed as a two-step procedure:

1. sample an element $x_t$ in $\Xi$ according to the distribution P;
2. do an approximate gradient step in which the parameter(s) are updated: $\theta_{t+1} = \theta_t - \eta_t \nabla_\theta f(x_t; \theta_t)$, where $\eta_t$ represents the gradient step size (a learning rate); and $\nabla_\theta f(x_t; \theta_t)$ is the gradient of function $f$, given data point $x_t$ and current parameters $\theta_t$.

One problem is in choosing the gradient step size. If $\eta_t$ is too big, the iterations do not tend to converge. If $\eta_t$ is too small, convergence may be very slow. In practice, when the number of unique elements in the support of P is small, the elements are not sampled i.i.d., but are explored one by one by doing multiple passes through the data. For simplicity, only the random version of SGD is considered, bearing in mind that a more ordered sampling may be employed.

Weighted Stochastic Gradient Descent

Similarly to importance sampling, it can be shown that it is not necessary to sample the elements according to the base distribution P. Rather, any distribution $Q \gg P$ can be used. The notation $Q \gg P$ means that P is absolutely continuous with respect to $Q$: $\forall x \in X$, $Q(x)=0 \rightarrow P(x)=0$. This means that when $Q=0$, P=0.

Denoting q as the density $$\frac{dQ}{dP},$$

the distribution can be written as:

$$\gamma(\theta) = \int_X \tilde{f}(x; \theta) dQ(x) \quad (2)$$

where $$\tilde{f}(x; \theta) = f(x; \theta) \frac{dP(x)}{dQ(x)} = \frac{f(x; \theta)}{q(x)}.$$

The Weighted SGD algorithm has the following form: At each iteration:

1. sample an element $x_t$ in X probabilistically, according to the distribution $Q$;

2. do an approximate gradient step: $\theta_{t+1} = \theta_t - \eta_t \nabla_\theta \tilde{f}(x_t; \theta_t)$ i.e., in the weighted SGD, the update is based on the variance of the gradient of the function $f$.

Variance of the Approximate Gradients

By construction, unbiased estimates of the gradient $\nabla_\theta \tilde{f}(x_t; \theta_t)$ can be obtained for any choice of the weighting distribution $Q$, i.e., $$E^Q[\nabla_\theta \tilde{f}(x_t; \theta_t)] = \nabla_\theta \gamma(\theta). \quad (3)$$

where $E^Q$ is the expectation of $Q$.

The efficiency of the base distributions $Q$ based on their variance $\Sigma Q(\theta)$ can be compared:

$$\sum_Q(\theta) \equiv Var_Q(\nabla_\theta \tilde{f}(x_t; \theta_t)) \quad (4)$$

$$= E_Q[\nabla_\theta \tilde{f}(x_t; \theta_t) \nabla_\theta^T \tilde{f}(x_t; \theta_t)] -$$

$$E_Q[\nabla_\theta \tilde{f}(x_t; \theta_t)] E_Q[\nabla_\theta^T \tilde{f}(x_t; \theta_t)]$$

$$= E_Q\left[\frac{\nabla_\theta f(x_t; \theta_t) \nabla_\theta^T f(x_t; \theta_t)}{q(x_t)^2}\right] - \nabla_\theta \gamma(\theta) \nabla_\theta^T \gamma(\theta) \quad (5)$$

Where $\nabla_\theta^T \ldots$ represents the transpose of the gradient $\nabla_\theta \ldots$.

Now, this formula can be used to choose the optimal sampling distribution $Q^*$ that has the variance $\Sigma Q(\theta)$ with the smallest magnitude, e.g., such that:

$$Q^* \in \operatorname*{argmin}_Q tr \sum_Q(\theta) \quad (6)$$

$$= \arg\min_Q E_Q\left[\left\|\frac{\nabla_\theta f(x_t; \theta_t)}{q(x)}\right\|^2\right] \quad (7)$$

i.e., the expectation of Q is a function (norm squared) of the gradient of the variance in the function $f$, i.e., of $\nabla_\theta \tilde{f}(x_t; \theta_t)$ and density $q(x)$.

Equation (7) is obtained by noting that $$E_Q\left[\frac{\nabla_\theta f(x_t; \theta_t)}{q(x)}\right]$$

does not depend on $Q$. Ideally it would be desirable to compute the best possible proposal for $Q$ at each iteration, i.e., for each different value of $\theta_t$, i.e., to select a distribution $Q$ on the basis of which the next sample $x_t$ is drawn which minimizes the variance in the function $f$. However, this is not necessary, and in the exemplary method, an approximation can be performed, as follows:

Adaptive Weighted Stochastic Gradient Descent

It can be demonstrated that instead of solving Equation (7) exactly, a gradient step can be performed at each iteration toward lower variance estimates.

Assume that the proposed probability distribution (from a family of distributions under consideration) is $Q_\tau$ where $\tau \in T$ is a set of parameters for the proposed probability distribution function. For example, $Q_\tau$ could be a Gaussian distribution $N(\mu, \Lambda^{-1})$ with parameters $\tau = (\mu, \Lambda) \in \Re^d \otimes S^+$, where $\mu$ is the mean and $\Lambda$ is the variance of the Gaussian distribution. $S^+$ represents the set of positive definite matrices and the symbol $\otimes$ means the Cartesian product.

The corresponding probability distribution function (pdf) of the proposed distribution $Q_\tau$ at point x is denoted $q(x; \tau)$. This function is assumed to be tractable, i.e. one can sample and compute $q(x; \tau)$ efficiently. The variance term also depends on $\tau$:

$$\Sigma_Q(\theta, \tau) \equiv Var_Q\left(\frac{\nabla_\theta f(x_t; \theta_t)}{q(x; \tau)}\right).$$

An algorithm for performing stochastic gradient descent using the adaptive weighting method is shown in Algorithm 1.

Algorithm 1: Adaptive Weighted Stochastic Gradient Descent (AW-SGD)

Initialize $\theta_0 \in \Theta$ and $\tau_0 \in T$.
$t \leftarrow 0$
while not converged do (1) $x_t \square Q(\cdot ; \tau_t)$ (2) $\theta_{t+1} \leftarrow \theta_t - \eta_t \dfrac{\nabla_\theta f(x_t; \theta_t)}{q(x_t; \tau_t)}$ (3) $\tau_{t+1} \leftarrow \tau_t + \varepsilon_t \left\|\dfrac{\nabla_\theta f(x_t; \theta_t)}{q(x_t; \tau_t)}\right\|^2 \nabla_\tau \log q(x_t; \tau_t)$ (4) $t \leftarrow t + 1$;
end while Algorithm 1 can be summarized as follows. The algorithm is initialized with initial values $\theta_0$ for a set of parameters $\Theta$ of the second function $f$ to be optimized. The initial values can be selected randomly, based on experimental data, or all set to some default value. The number t of iterations performed is initialized to 0. Initial values for the set of parameters $\tau$ of the modified probability distribution $Q$ are also established, e.g., by selecting mean and variance of any suitable Gaussian distribution which is continuous with P.

In each iteration t, steps (1)-(4) of the algorithm are performed. Step (1) involves sampling a data point according to the current distribution $Q$ whose parameters $\tau_t$ were established in the prior iteration (S104). Eq (1) represents the sampling of a random variable according to $Q$, which is a function of the current value of $\tau_t$.

Step (2) involves updating the parameters $\Theta$ of the function $f$ as a function of the current values $\theta$ of these parameters, a gradient step size $\eta_t$ and the gradient of $\tilde{f}$, i.e., $$\frac{\nabla_\theta f(x; \theta_t)}{q(x; \tau_t)}$$

(S106).

$$\frac{\nabla_\theta f(x; \theta_t)}{q(x; \tau_t)}$$

is the weighted gradient of the second function, computed as a function of $\theta_t$ and $x_t$, where the weight is the inverse of $q(x_t; \tau_t)$, so that its expectation is equal to the gradient of the second function. $q(x_t; \tau_t)$ is the probability of drawing $x_t$ according to the modified probability distribution function $Q$. This step depends on $\tau_t$ in order to apply lower weights to high probabilities of $Q$ in order to guarantee that the gradient in (2) is on average equal to the gradient of the target function $\gamma$.

$\theta_t$ is the current value at time t of the parameter of the second function;

$\eta_t$ is the step size;

$x_t$ is a random sample drawn according to the modified probability distribution function; and $$\frac{\nabla_\theta f(x_t; \theta_t)}{q(x_t; \tau_t)}.$$

Step (3) involves updating the parameters τ of the distribution $Q$ as a function of a step size $\epsilon_t$ (learning rate) for the updating of parameter τ and the gradient of the variance in Eqn. (6): i.e., the squared norm of the ratio of the gradient of the function $f$ to q, multiplied by the gradient of the log of q:

$$\left\| \frac{\nabla_\theta f(x_t; \theta_t)}{q(x_t; \tau_t)} \right\|^2 \nabla_\tau \log q(x_t; \tau_t).$$

This step aims at optimizing τ rather than θ. By changing the parameters τ, the sampling distribution Q is changed for the next iteration. As for step (2) this is also a stochastic gradient approximation step, rather than an exact computation (S108).

Step (4) involves a standard step of incrementing the iteration number to proceed to the next iteration.

Steps (1)-(4) are continued until a stopping criterion is met (S110). The iterations may be continued while γ(θ) continues to converge. However, since γ(θ) is not computed in the example algorithm, the iterations may be continued until the pre-defined fixed number of iterations is reached. It can be shown mathematically that Algorithm 1 does in fact converge, rather than achieving simply a local optimum, for a wide variety of cases. In other embodiments, the iterations are continued while τ continues to change by more than a threshold amount, or the like.

The step sizes $\eta_t$ and $\epsilon_t$ can be fixed or variable (for example, decreasing as more iterations are performed). For example, $\eta_t$ could be set at a fixed value of, for example, from 0.0001 to 0.2, or could be set as the minimum of a fixed value and a function of the number of iterations, e.g., $$\eta_t = \min\left(\frac{1}{10}, \frac{50}{t}\right).$$

In this example, $\eta_t$ decreases as a function of the number of iterations, but only begins to decrease after a predefined number (500 in this example) of iterations.

Similarly, $\epsilon_t$ could be set at a fixed value of, for example, from 0.0001 to 0.2, or could be set as the minimum of a fixed value and a function of the number of iterations, e.g., $$\varepsilon_t = \min\left(\frac{1}{100}, \frac{10}{t}\right).$$

In this example, $\epsilon_t$ decreases, but only after 1000 iterations.

It can be shown that the gradient steps in the updates are noisy (but unbiased) estimates of the gradient of the variance:

$$\nabla_\tau \Sigma_Q(\theta, \tau) = \nabla_\tau E_Q\left[\left\|\frac{\nabla_\theta f(x_t; \theta_t)}{q(x; \tau)}\right\|^2\right] \quad (8)$$

$$= E_Q\left[\left\|\frac{\nabla_\theta f(x_t; \theta_t)}{q(x_t; \tau_t)}\right\|^2 \nabla_\tau \log q(x_t; \tau_t)\right] \quad (9)$$

The exemplary method avoids the need to compute Eqn. (9), by using step (3) of the algorithm.

To illustrate the sampling step (S104), FIG. 3 illustrates examples of a simplified normal base distribution P where the y axis shows the probability of drawing a sample x from the dataset, and four different modified distributions $Q$, covering the range of x values from −2 to 6. In this example, the goal is to minimize the integral of 0.5*N(x|1.0,1.0)*(x−θ)² over the real line, where N(x|m,v) is the probability density function at point x of a Gaussian variable with mean in and variance v. It can be shown with straightforward algebra that the solution can be found in closed form: the best possible θ (the one minimizing the integral) is θ=1. In practice, of course, the solution to many problems cannot be found in this way. Assume that at a given step of the algorithm, θ=0.5. On each plot, a different choice of $Q$ has been studied:

Plot 1: mean=1, variance=1;
Plot 2: mean=1, variance=1.3²;
Plot 3: mean=1.3, variance=1
Plot 4: mean=1.3, variance=1.3².

The gradient g ($\nabla_\theta$f(x,θ)p(x)/q(x)) for each possible choice of x is also shown for each plot. The expected gradient $\nabla_{\theta\gamma}(\theta)$ is the horizontal line at y. Formally, it is equal to the integral of N(x|1.0,1.0)*(θ−x) over the real line. In the example, it can be shown that it is equal on average to −0.5, as shown in the plots. However, in the general case of stochastic gradient descent, this gradient is not known, but uses an approximate gradient $Q$ (four different choices are shown in the figure), the estimated gradient g satisfies E [g]=0.5, where the expectation is taken with respect to $Q$. Since the best possible choice of $Q$ is the one that give the smallest variance of the gradient, the variance of g, Var[g] is computed and shown in the title of each plot. It can be seen that the choice q(x)=N (x|1.3,1.3) leads to a variance equal to 0.77, which is smaller than the other choices of $Q$. For this value of θ (θ=0.5), the best $Q$ distribution is not equal to the P distribution, since it gives a higher variance (Var[g]=1).

The exemplary approach is similar to adaptive importance sampling using stochastic gradient. See, for example, W. A. Al-Qaq, M. Devetsikiotis, and J.-K. Townsend, "Stochastic gradient optimization of importance sampling for the efficient simulation of digital communication systems," IEEE Transactions on Communications, 43(12):2975-2985, December 1995; W. A. Al-Qaq and J. K. Townsend, "A stochastic importance sampling methodology for the efficient simulation of adaptive systems in frequency nonselective Rayleigh fading channels," IEEE Journal on Selected Areas in Communications, 15(4):614-625, May 1997. In these adaptive importance sampling methods, the optimal importance distribution is learned by minimizing the variance of the sampling distribution using a stochastic approximation procedure, but it is not used to minimize a function of the form Eqn. (1).

Adaptations to the Method

1. Batching

It is to be appreciated that Algorithm 1 can be adapted to batching (sampling multiple data points at each iteration instead of a single one in step (1)) to further reduce the variance of the gradient.

2. Scaling

To obtain good convergence properties, the gradient can be scaled, ideally in the direction of the inverse Hessian. However, this type of second-order method is slow in practice. One can estimate the Hessian greedily, as in Quasi-Newton methods such as LM-FBGS, and adapt it to SGD algorithm, similarly to the method in Friedlander.

Applications

There are many applications of SGD in solving data analytics problems. As examples, the exemplary method can be used in the following problems:

1. Large scale learning. These include classical applications of SGD. See, for example, those exemplified in Léon Bottou, "Online algorithms and stochastic approximations," in Online Learning and Neural Networks (David Saad, editor, Cambridge University Press, Cambridge, UK, 1998);] Léon Bottou and Olivier Bousquet, "The tradeoffs of large scale learning," in, Optimization for Machine Learning, pp. 351-368 (Suvrit Sra, Sebastian Nowozin, and Stephen J. Wright, Eds, MIT Press, 2011); M. Friedlander and M. Schmidt, "Hybrid deterministic-stochastic methods for data fitting," UBC-CS technical report, TR-2011-01.

2. Optimization under uncertainty (e.g., stock management).

3. Parameter estimation in latent variable models: Any application where an expectation maximization/minimization (EM) algorithm is used. The likelihood can be expressed as: $\int_Z p(z|\theta)p(x|z,\theta)dz$. The quantity $f(x,\theta)=p(z|\theta)p(x|z,\theta)$ is known as the complete likelihood.

4. Variational inference. SGD can be used to minimize the variational objective, which is sometimes intractable.

As one example, the method can be used to estimate an average future reward, e.g., which is expressed as an integral of all future rewards. Another example is to estimate the minimum cost of stocks.

Without intending to limit the scope of the exemplary embodiment, the following examples demonstrate the applicability of the method.

EXAMPLES

The exemplary algorithm can work on any integrable function, and should be particularly effective on high dimensional problems, but as an illustration, the algorithm is tested on a 1D integral with one parameter θ:

$$\gamma(\theta) = \int_X \log(1+\exp(\theta x))N(x)dx$$

where N (x) is the standard normal distribution (density). The integral function γ is convex and has therefore a unique minimum.

A conventional SGD algorithm was run using the sampling N (x) and the learning rate optimized for this algorithm. Good performance was found with a learning rate $$\eta_t = \min\left(\frac{1}{10}, \frac{50}{t}\right).$$

Then, Algorithm 1 (adaptive weighted SGD) was run using the learning rate $$\varepsilon_t = \min\left(\frac{1}{100}, \frac{10}{t}\right).$$

Table 1 shows numerical experiments averaged over 100 repetitions. The error is the distance from the optimal point computed numerically (using quadrature). AW-SGD is the exemplary adaptive weighted SGD algorithm. SGD is the conventional stochastic gradient descent method outlined above (without step (3) of algorithm 1). The values in parentheses are the standard deviations. It can be seen that the improvement is about 50% of error decrease, while having an increase of only 15-30% of computation time for the same number of iterations.

TABLE 1

| Method | No. of iterations | error | Average time (sec) to complete No. of iterations |
|---|---|---|---|
| SGD | 1000 | 0.1494 (0.096001) | 0.0332 (0.013606) |
| AW-SGD | 1000 | 0.1385 (0.095534) | 0.0523 (0.009760) |
| SGD | 10,000 | 0.0458 (0.032266) | 0.2562 (0.017901) |
| AW-SGD | 10,000 | 0.0351 (0.024292) | 0.4593 (0.017363) |
| SGD | 100,000 | 0.0136 (0.011289) | 2.5013 (0.055575) |
| AW-SGD | 100,000 | 0.0102 (0.007616) | 4.5502 (0.129989) |

The standard deviation is lower with the present AW-SGD method, indicating that the method provides less variability in results, which is advantageous.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An optimization method comprising:
receiving data to be sampled in optimizing a first function, which is an integral of a second function weighted according to a base probability distribution, the second function having at least one first parameter to be determined in the optimizing of the integral first function;
for a number of iterations:
sampling the data according to a modified probability distribution function which depends on at least one second parameter;
updating at least one of the at least one first parameter of the second function, comprising modifying a previous value of the at least one first parameter of the second function as a function of a first step size and a weighted gradient of the second function;
updating at least one of the at least one second parameter of the modified probability distribution function;
wherein in a subsequent one of the iterations, the modified probability distribution function used in sampling the data is based on the updated at least one second parameter of the distribution function; and
outputting information based on the at least one first parameter of the second function as updated in a later one of the iterations.

2. The method of claim 1, wherein the updating of the at least one first parameter of the second function is performed by gradient descent.

3. The method of claim 1, wherein the updating of the at least one second parameter of the modified probability distribution function is performed by gradient descent.

4. The method of claim 1, wherein the modified probability distribution function comprises a normal distribution function and the at least one second parameter which is updated comprises at least one of its mean and variance.

5. The method of claim 1, wherein the first step size has a value which is a function of a number of the iterations which have been performed.

6. The method of claim 1, wherein the updating of the at least one first parameter of the second function is performed according to the equation:

$$\theta_{t+1} \leftarrow \theta_t - \eta_t \frac{\nabla_\theta f(x_t; \theta_t)}{q(x_t; \tau_t)},$$

where:
$\theta_t$ is the current value at iteration t of the parameter of the second function;
$\eta_t$ is the step size;
$x_t$ is the value of a random sample drawn from the data according to the modified probability distribution function; and $$\frac{\nabla_\theta f(x_t; \theta_t)}{q(x_t; \tau_t)}$$

is the weighted gradient of the second function, computed as a function of $\theta_t$ and $x_t$, weighted by the inverse of $q(x_t;\tau_t)$, and where $q(x_t;\tau_t)$ is the probability of drawing $x_t$ according to the modified probability distribution function.

7. The method of claim 1, wherein the updating of the at least one second parameter of the modified probability distribution function minimizes the variance of the approximate gradient in the second function in each iteration.

8. The method of claim 1, wherein the integral of the function to be optimized is convex.

9. The method of claim 1, wherein the modified probability distribution function differs from the base probability distribution and is absolutely continuous with respect to the base distribution function.

10. The method of claim 1, wherein the updating of the at least one first parameter of the second function is based on a first step size and an estimation of the gradient of the second function and the updating of the at least one of the at least one second parameter of the distribution function based on a second step size an estimation of the variance of the gradient of the second function.

11. The method of claim 1, wherein the output information comprises at least one of:
a solution to the integral function;
the updated at least one parameter of the second function; and
information based thereon.

12. An optimization method comprising:
receiving data to be sampled in optimizing a first function, which is an integral of a second function weighted according to a base probability distribution, the second function having at least one first parameter to be determined in the optimizing of the integral first function;
for a number of iterations:
sampling the data according to a modified probability distribution function which depends on at least one second parameter;
updating at least one of the at least one first parameter of the second function;
updating at least one of the at least one second parameter of the modified probability distribution function, comprising modifying a previous value of the at least one second parameter as a function of a second step size and a quantity equal on average to a gradient of the variance of the first parameter update;
wherein in a subsequent one of the iterations, the modified probability distribution function used in sampling the data is based on the updated at least one second parameter of the distribution function; and
outputting information based on the at least one first parameter of the second function as updated in a later one of the iterations.

13. The method of claim 12, wherein the updating of the at least one first parameter of the second function comprises modifying a previous value of the at least one first parameter of the second function as a function of a first step size and a weighted gradient of the second function.

14. The method of claim 12, wherein the second step size has a value which is a function of a number of the iterations which have been performed.

15. The method of claim 12, wherein the updating of the at least one of the at least one second parameter is performed according to the equation:

$$\tau_{t+1} \leftarrow \tau_t + \varepsilon_t \left\| \frac{\nabla_\theta f(x_t; \theta_t)}{q(x_t; \tau_t)} \right\|^2 \nabla_\tau \log q(x_t; \tau_t),$$

where:
$\tau_t$ is the current value of the second parameter of the modified probability distribution function at iteration t,
$\theta_t$ is the current value of the first parameter of the second function;
$\varepsilon_t$ is the step size;
$x_t$ is the value of a random sample drawn from the data according to the modified probability distribution function; and $$\left\| \frac{\nabla_\theta f(x_t; \theta_t)}{q(x_t; \tau_t)} \right\|^2 \nabla_\tau \log q(x_t; \tau_t)$$

is equal on average to the gradient of the variance of the first parameter update.

16. An optimization method comprising:
receiving data to be sampled in optimizing a first function, which is an integral of a second function weighted according to a base probability distribution, the second function having at least one first parameter to be determined in the optimizing of the integral first function, the integral function being of the form:

$$\gamma(\theta) = \int_X \theta(x;\theta) dP(x) \qquad (1),$$

where:
$dP(x)$ represents the weight applied to a sample x, and where P is a probability distribution on a measurable space $\Xi$ from which the data samples are drawn,
$f$ represents the second function; and
$\theta$ represents the at least one first parameter;
for a number of iterations:
sampling the data according to a modified probability distribution function which depends on at least one second parameter;
updating at least one of the at least one first parameter of the second function;
updating at least one of the at least one second parameter of the modified probability distribution function;
wherein in a subsequent one of the iterations, the modified probability distribution function used in sampling the data is based on the updated at least one second parameter of the distribution function; and outputting information based on the at least one first parameter of the second function as updated in a later one of the iterations.

17. A computer program product comprising a non-transitory recording medium storing instructions, which when executed on a computer causes the computer to perform the method of claim 1.

18. A system comprising memory which stores instructions for performing the method of claim 1 and a processor, in communication with the memory, which executes the instructions.

19. A system comprising:
    memory which receives data to be sampled in optimizing an integral function, which is an integral of a second function weighted according to a base probability distribution, the second function having at least one first parameter to be determined in the optimizing of the integral function;
    a sampling component for sampling the data according to a modified probability distribution function which depends on at least one second parameter;
    a first update component for updating the at least one first parameter of the second function;
    a second update component for updating the at least one second parameter of the modified probability distribution function;
    wherein at least one of:
        the updating of the at least one first parameter of the second function is based on a first step size and an estimation of the gradient of the second function, and
        the updating of the at least one of the at least one second parameter of the distribution function based on a second step size an estimation of the variance of the gradient of the second function;
    wherein in a subsequent one of a number of iterations, the modified probability distribution function used by the sampling component for sampling the data is based on the updated second parameter of the modified probability distribution function;
    an information output component for outputting information based on the at least one updated first parameter of the integral function of a later one of the iterations; and
    a processor which implements the first and second update components.

20. A method for optimizing a function using adaptive weighted stochastic gradient descent, comprising:
    receiving data to be sampled in optimizing a first function which is an integral of a second function depending on at least one first parameter in which elements are weighted by a base probability distribution function;
    for a number of iterations:
        sampling the data according to a modified probability distribution function which depends on at least one second parameter, wherein the modified probability distribution function differs from the base probability distribution function and is absolutely continuous with respect to the base probability distribution function;
        updating the at least one first parameter of the second function based on a first step size and an estimation of the gradient of the second function;
        updating at least one of the at least one second parameter of the distribution function based on a second step size an estimation of the variance of the gradient of the second function;
        wherein in a subsequent one of the iterations, the distribution function used in sampling the data is based on the updated at least one second parameter of the distribution function;
    outputting information based on the at least one first parameter of the second function as updated in a later one of the iterations.

* * * * *